US010712505B2

(12) United States Patent
Liao et al.

(10) Patent No.: US 10,712,505 B2
(45) Date of Patent: Jul. 14, 2020

(54) OPTICAL FIBER CONNECTOR

(71) Applicant: PEGATRON CORPORATION, Taipei (TW)

(72) Inventors: Cheng-Yi Liao, Taipei (TW);
Cheng-Chung Chen, Taipei (TW);
Wei-Chun Tsao, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/224,289

(22) Filed: Dec. 18, 2018

(65) Prior Publication Data

US 2019/0196115 A1 Jun. 27, 2019

(30) Foreign Application Priority Data

Dec. 27, 2017 (TW) .............................. 106146051 A

(51) Int. Cl.
*G02B 6/38* (2006.01)
*G02B 6/36* (2006.01)

(52) U.S. Cl.
CPC ......... *G02B 6/3826* (2013.01); *G02B 6/3825* (2013.01); *G02B 6/3869* (2013.01); *G02B 6/3893* (2013.01)

(58) Field of Classification Search
CPC .. G02B 6/3826; G02B 6/3869; G02B 6/3893; G02B 6/3825
USPC ....................................... 385/55, 70, 72, 78
See application file for complete search history.

(56) References Cited

U.S. PATENT DOCUMENTS

| 5,052,774 A * | 10/1991 | Bulman | G02B 6/3825 |
| | | | 385/76 |
| 9,933,583 B2 * | 4/2018 | Yan | G02B 6/3869 |
| 2006/0093274 A1 * | 5/2006 | Kahle | G02B 6/3825 |
| | | | 385/70 |
| 2010/0054668 A1 * | 3/2010 | Nelson | G02B 6/3825 |
| | | | 385/78 |
| 2019/0101709 A1 * | 4/2019 | Wang | G02B 6/3849 |

FOREIGN PATENT DOCUMENTS

| CN | 202583528 U | 12/2012 |
| TW | I306957 B | 3/2009 |

* cited by examiner

*Primary Examiner* — Kaveh C Kianni
*Assistant Examiner* — Hung Q Lam
(74) *Attorney, Agent, or Firm* — Muncy, Geissler, Olds & Lowe, P.C.

(57) ABSTRACT

An optical fiber connector configured for engaging with an external optical fiber connector includes a fiber core, a connector body, a coupling tube, and at least one coupling holder. The connector body has a first end portion and a second end portion, and the first end portion connects and fixes the fiber core. The second end portion is depressed inwardly to define a coupling space, and the external optical fiber connector is detachably plugged into the coupling space and coupled with the fiber core. The coupling tube is disposed in the connector body, and a portion of the coupling tube is located in the coupling space. One end portion of the fiber core is inserted in the coupling tube. The coupling holder is disposed in the coupling space, and corresponding to the coupling tube.

10 Claims, 3 Drawing Sheets ered by refer-

OPTICAL FIBER CONNECTOR

CROSS REFERENCE TO RELATED APPLICATIONS

This Non-provisional application claims priority under 35 U.S.C. § 119(a) on Patent Application No(s). 106146051 filed in Taiwan, Republic of China on Dec. 27, 2017, the entire contents of which are hereby incorporated by reference.

BACKGROUND

Technology Field

The disclosure relates to an optical fiber connector and, in particular, to an optical fiber connector having a one-piece connector body.

Related Art

With the fast development of technology, the demands for data processing speed and capacity are rapidly increasing, so the conventional cable lines cannot support the required bandwidth and speed requirements. Therefore, optical fibers are introduced for data transmission and communication. However, in the field of optical fiber communication, the assembly accuracy between the optical fiber connector and the optical fiber adapter directly defines the transmission efficiency and quality of the optical signals. Thus, how to improve the optical coupling accuracy between the optical fiber connector and the optical fiber adapter has become one of the important topics in the field.

Traditionally, the assembling process of the optical fiber connector and the optical fiber adapter is usually performed by hands (operators). However, due to the different personal experiences of the operators, the coupling tube in the optical fiber adapter is often damaged due to excessive pushing. Besides, the end portion of the fiber core may also be damaged due to the excessive angle offset, or the optical fiber connector and the optical fiber adapter may not be engaged well and loose from each other, when inserting the optical fiber connector into the optical fiber adapter. In addition, during the assembly with the circuit board, no protection device for the optical fiber connector is provided, so the optical fiber connector may have collision, or the external dusts may enter into the optical fiber adapter, thereby affecting transmission efficiency and quality.

Therefore, it is desired to provide an optical fiber connector, which can increase the optical coupling precision with the external optical fiber connector, simplify the assembly process, and reduce the component damage caused by human factors or working environment during the assembly process, thereby decreasing the production cost and improving the transmission efficiency and quality of the optical signals.

SUMMARY

In view of the foregoing, an objective of this disclosure is to provide an optical fiber connector, which can increase the optical coupling precision with the external optical fiber connector, and reduce the component damage caused by human factors or working environment during the assembly process, thereby improving the transmission efficiency and quality of the optical signals.

To achieve the above, the present disclosure provides an optical fiber connector configured for engaging with an external optical fiber connector. The optical fiber connector comprises a fiber core, a connector body, a coupling tube, and at least one coupling holder. The connector body has a first end portion and a second end portion. The first end portion connects and fixes the fiber core, and the second end portion is depressed inwardly to define a coupling space. The external optical fiber connector is detachably plugged into the coupling space and coupled with the fiber core. The coupling tube is disposed in the connector body. A portion of the coupling tube is located in the coupling space, and one end portion of the fiber core is inserted in the coupling tube. The coupling holder is disposed in the coupling space, and corresponding to the coupling tube.

In one embodiment, the optical fiber connector further comprises an optical fiber inserted into the first end portion of the connector body. One end portion of the optical fiber is disposed in the fiber core. The optical fiber comprises at least a core portion and a covering portion encapsulating the core portion, and the covering portion is made of resin or rubber.

In one embodiment, the optical fiber connector further comprises an optical fiber fixing member. One end of the optical fiber fixing member is connected to the first end portion of the connector body, and the optical fiber fixing member clips and fixes the optical fiber.

In one embodiment, the optical fiber fixing member and the connector body are made of different materials and integrated as one component.

In one embodiment, the connector body further comprises a limiting groove disposed on a surface of the second end portion of the connector body, and the limiting groove extends from an end surface of the second end portion toward the first end portion and communicates with the coupling space.

In one embodiment, the end portion of the fiber core inserted in the coupling tube is a micro protruding ball end portion.

In one embodiment, an end surface of the end portion of the fiber core is a planar surface or a slant surface.

In one embodiment, the coupling tube is made of glass or ceramics.

In one embodiment, the fiber core is made of glass or ceramics.

In one embodiment, the coupling holders are located adjacent to an outer periphery of the coupling tube, the coupling holders are disposed corresponding to each other, and one end of each coupling holder is configured with a corresponding hook portion.

As mentioned above, the optical fiber connector of this disclosure integrates the conventional optical fiber connector and optical fiber adapter as one structure. In this disclosure, the connector body, the coupling holder, the coupling tube and the fiber core are directly integrated as one component (one-piece design) during the manufacturing process, so that the assembling process can be sufficiently simplified, thereby preventing the damage of the coupling tube and the fiber core caused by inserting offset or excessive pushing in the assembling procedure. Thus, the optical fiber connector and the optical fiber adapter can be engaged well and not loose from each other, thereby improving the production yield. In addition, since the coupling tube and the fiber core are designed inside the connector body, the coupling tube and the fiber core can be always under the protection situation during the assembling process. This configuration can reduce the component damage caused by human factors or working environment, thereby decreasing the production cost and improving the transmission efficiency and quality of the optical signals.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE EMBODIMENTS

The present disclosure will be apparent from the following detailed description, which proceeds with reference to the accompanying drawings, wherein the same references relate to the same elements.

Figure 1:
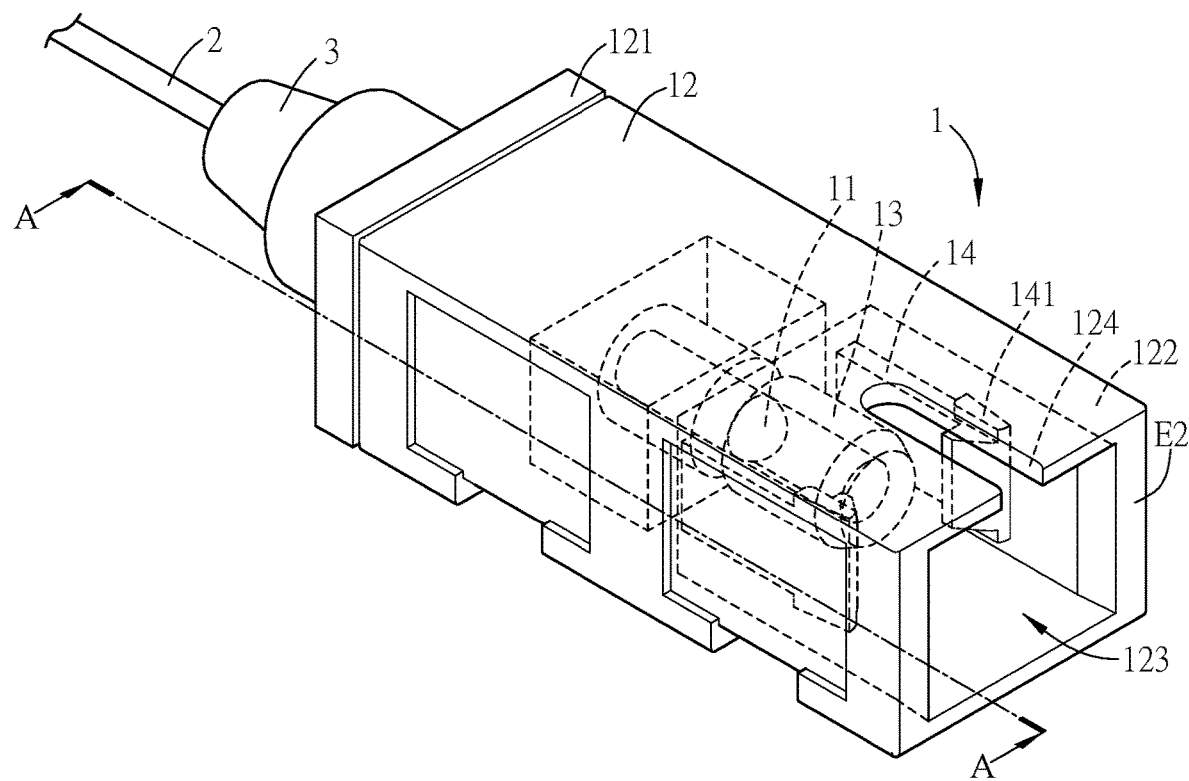
FIG. 1 is a schematic perspective diagram of an optical fiber connector of this disclosure.
Figure 2:
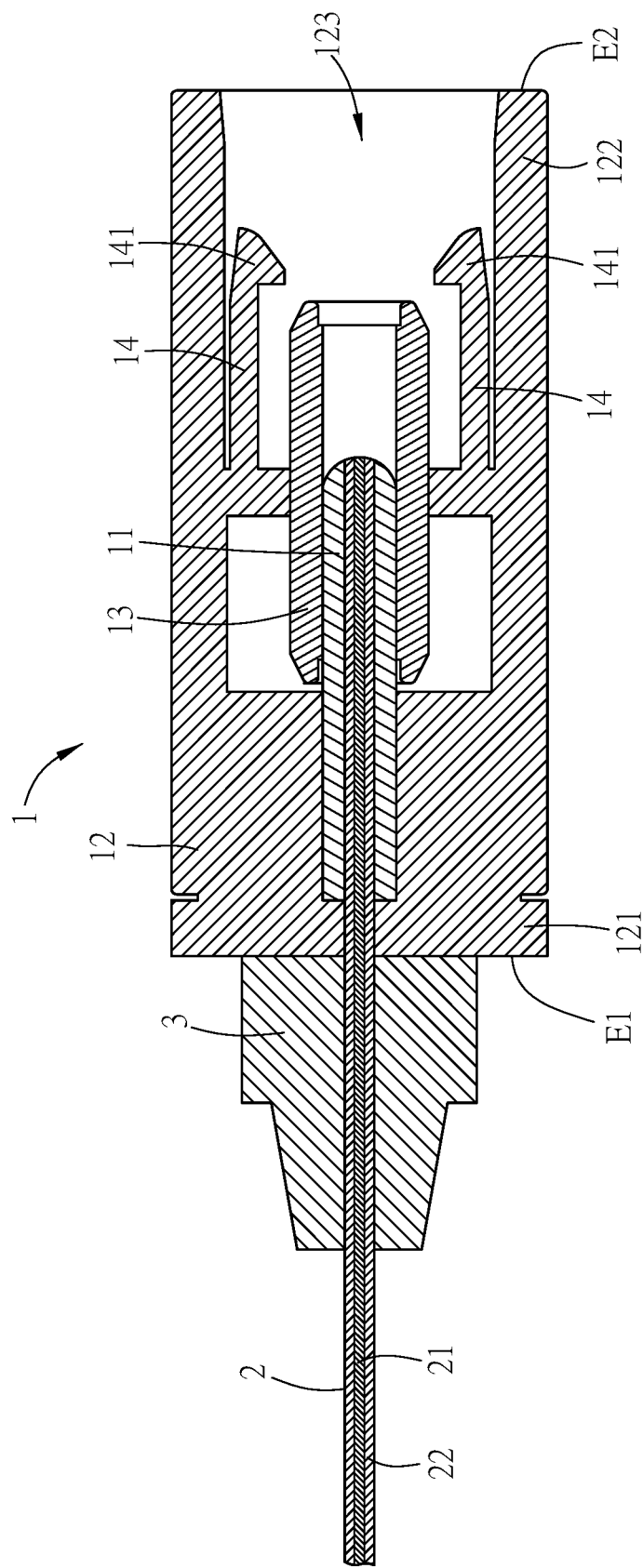
FIG. 2 is a sectional view of the optical fiber connector of FIG. 1 along the line A-A while viewing from the top.
Figure 3:
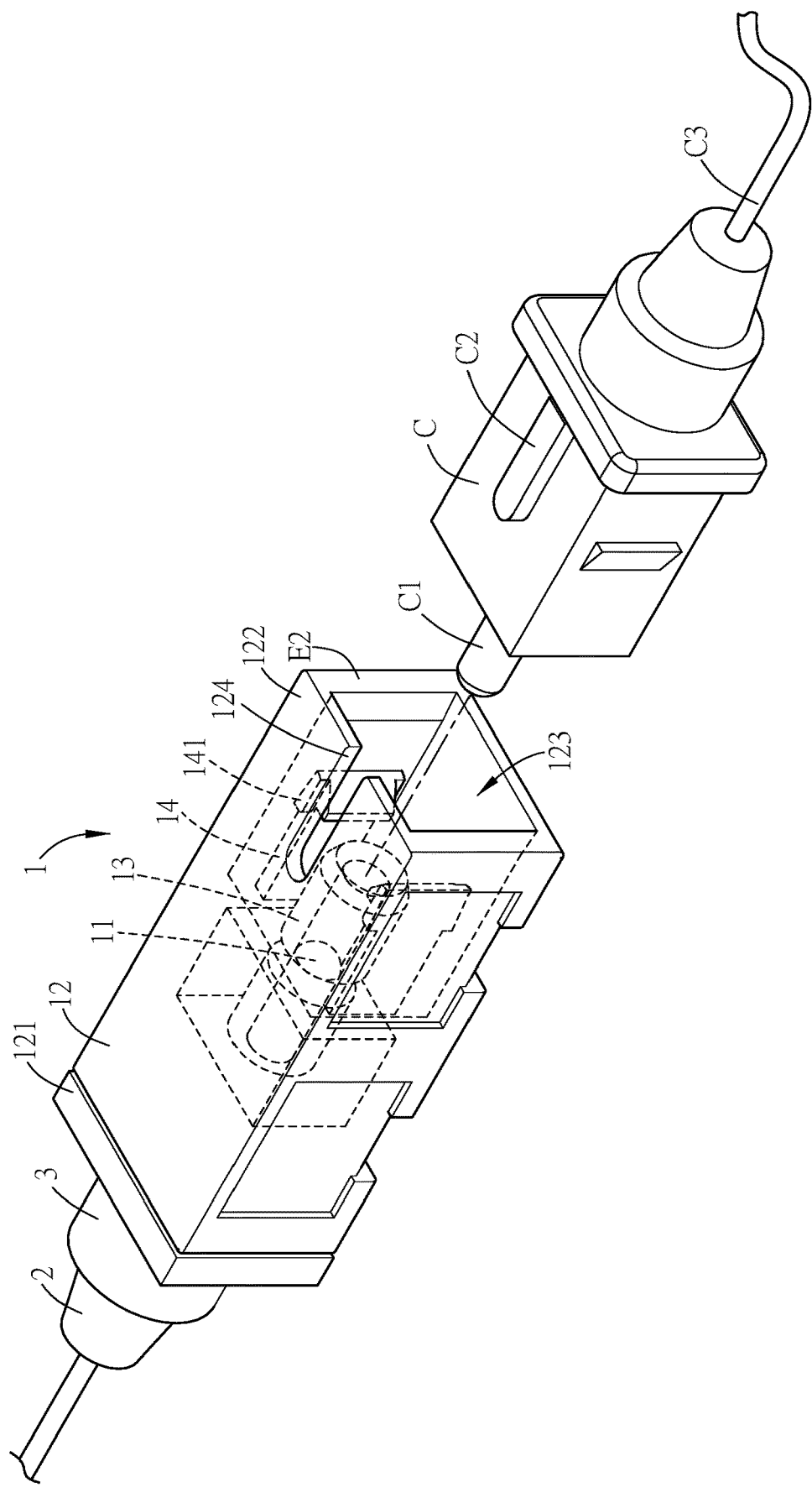
FIG. 3 is a schematic diagram showing the assembling of an external optical fiber connector and the optical fiber connector of FIG. 1.

FIG. 1 is a schematic perspective diagram of an optical fiber connector of this disclosure, FIG. 2 is a sectional view of the optical fiber connector of FIG. 1 along the line A-A while viewing from the top, and FIG. 3 is a schematic diagram showing the assembling of an external optical fiber connector and the optical fiber connector of FIG. 1.

Referring to FIGS. 1 to 3, this disclosure provides an optical fiber connector 1 configured for engaging with an external optical fiber connector C. The optical fiber connector 1 comprises a fiber core 11, a connector body 12, a coupling tube 13, and at least one coupling holder 14. The connector body 12 and the coupling holder 14 are integrated as a one-piece component. The connector body 12 has a first end portion 121 and a second end portion 122. The first end portion 121 has an end surface E1, and the second end portion 122 has an end surface E2. The connector body 12 is made of at least one thermoplastic material, and the fiber core 11 and the coupling tube 13 are connected and disposed inside the connector body 12 by coated injection. In this embodiment, the first end portion 121 of the connector body 12 connects and fixes the fiber core 11. In addition, the end surface E2 of the second end portion 122 is depressed inwardly to define a coupling space 123. The external optical fiber connector C is detachably plugged into the coupling space 123 and coupled with the fiber core 11.

The coupling tube 13 is disposed in the connector body 12. A portion of the coupling tube 13 is connected and fixed by the connector body 12 and located adjacent to the first end portion 121, and a portion of the coupling tube 13 is exposed from the coupling space 123. One end portion of the fiber core 11 is inserted in the coupling tube 13, and the other end portion of the fiber core 11 is covered and fixed by the connector body 12. Moreover, the coupling holders 14 are disposed in the coupling space 123, and corresponding to the coupling tube 13. In the coupling space 123, the coupling holders 14 are disposed adjacent to the outer periphery of the coupling tube 13, and the coupling holders 14 are disposed corresponding to each other. The coupling holders 14 are configured to engage and fix the external optical fiber connector C. In this embodiment, the coupling tuber 13 can be made of glass or ceramics, and the fiber core 11 can also be made of glass and ceramics.

The conventional optical fiber connector must be assembled with the optical fiber adapter manually, and then connected to the external optical fiber connector C for performing the optical signal transmission. Different from the conventional approach, this disclosure directly integrates the internal components of the conventional optical fiber connector and optical fiber adapter in the connector body 1 so as to form the optical fiber connector 1, so that the assembling process can be sufficiently simplified and the damages caused by human factors or working environment can be reduced, thereby improving the transmission efficiency and quality of the optical signals. Moreover, the connector body 12 is integrally formed as a one-piece component, so that the packaging strength and resistance to insertion and removal of the connector body 12 can be sufficiently enhanced.

In this embodiment, the optical fiber connector 1 further comprises an optical fiber 2 inserted into the first end portion 121 of the connector body 12. One end portion of the optical fiber 2 is disposed and fixed in the fiber core 11. The optical fiber 2 comprises at least a core portion 21 and a covering portion 22 encapsulating the core portion 21. The covering portion 22 is made of resin or rubber. In addition, the optical fiber connector 1 further comprises an optical fiber fixing member 3. One end of the optical fiber fixing member 3 is connected to the first end portion 121 of the connector body 12. The optical fiber fixing member 3 and the connector body 12 are made of different materials and integrated as one component. The optical fiber fixing member 3 clips and fixes the optical fiber 2, so that the stress (pushing force) applied to the optical fiber 2 during the assembling process can be dissipated, thereby protecting the optical fiber 2 from damage or loose.

The connection method of the optical fiber connector 1 and the external optical fiber connector C will be further described hereinafter with reference to FIGS. 1, 2 and 3. In this embodiment, the optical fiber connector 1 is an SC connector (Square connector) having a plug latch design for connecting with the external optical fiber connector C. The connector body 12 further comprises a limiting groove 124 disposed on a surface of the second end portion 122 of the connector body 12, and the limiting groove 124 extends from the end surface E2 of the second end portion 122 toward the first end portion 121 and communicates with the coupling space 123. When the external optical fiber connector C is inserted through second end portion 122 of the connector body 12 and then enters into the coupling space 123, the protrusion C2 disposed on the surface of the external optical fiber connector C can match with the limiting groove 124 of the connector body 12. Accordingly, the connection position of the external optical fiber connector C and the connector body 12 can be controlled, thereby preventing the physical damage of the coupling tube 13 and the fiber core 11 of the optical fiber connector 1 caused by the assembling tolerance.

In addition, the coupling holders 14 are disposed adjacent to the outer periphery of the coupling tube 13, and the coupling holders 14 are disposed corresponding to each other. One end of each coupling holder 14 is configured with a corresponding hook portion 141. The external optical fiber connector C comprises an external fiber core C1 and an external optical fiber C3 disposed in the external fiber core C1. The external optical fiber connector C is detachable plugged in the coupling space 123 of the connector body 12, and firmly fastened by the coupling holders 14.

In this embodiment, the end portion of the fiber core 11 inserted in the coupling tube 13 is a micro protruding ball end portion (not shown). Specifically, the optical fiber connector 1 of this embodiment can be UPC (Ultra Physical Contact) type or APC (Angled Physical Contact) type. The end portion of the UPC type fiber core 11 is a micro protruding ball end portion with an end surface being formed as a planar surface. When the optical fiber connector 1 containing the UPC type fiber core 11 is connected with the external optical fiber connector C, the external fiber core C1 can insert into the coupling tube 13 and be disposed corresponding to the end portion of the fiber core 11. In this case, the external fiber core C1 of the external optical fiber connector C should be also UPC type, so that the fiber core 11 and the external fiber core C1 can be assembled without causing undesired collision and damage.

In addition, the end portion of the APC type fiber core 11 is a micro protruding ball end portion, and an end surface thereof is formed as an 8-degree slant surface for reducing the reflection of the optical signals. When the optical fiber connector 1 containing the APC type fiber core 11 is connected with the external optical fiber connector C, the external fiber core C1 can insert into the coupling tube 13 and be disposed corresponding to the end portion of the fiber core 11. In this case, the external fiber core C1 of the external optical fiber connector C should be also APC type, so that the fiber core 11 and the external fiber core C1 can be assembled without causing undesired collision and damage. When the external optical fiber connector C transmits the optical signals, the slant surface of the end portion of the APC type fiber core 11 can reflect the optical signals with an angle. In more detailed, the optical signals can be reflected with an angle instead of being reflecting toward the incident direction, which may cause the interference of the optical signal, thereby improving the quality of optical signal transmission.

In summary, the optical fiber connector of this disclosure integrates the internal components of the conventional optical fiber connector and optical fiber adapter in the connector body, so that the assembling process can be sufficiently simplified, the optical coupling accuracy of the connector body and the external optical fiber connector can be increased, and the damages caused by human factors or working environment can be reduced, thereby improving the transmission efficiency and quality of the optical signals. Moreover, the connector body, the coupling holders, the coupling tube and the fiber core are integrally formed as a one-piece component, so that the packaging strength and resistance to insertion and removal of the connector body while connecting to the external optical fiber connector can be sufficiently enhanced with comparing to the conventional optical fiber connector and optical fiber adapter.

Besides, the design of the limiting groove of the connector body and the protrusion of the external optical fiber connector can precisely control the connection position of the external optical fiber connector and the connector body. Thus, the optical coupling accuracy of the optical fiber connector and the external optical fiber connector can be increased, and the damage of the coupling tube and the fiber core of the optical fiber connector caused by the assembling tolerance can be prevented.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. An optical fiber connector configured for engaging with an external optical fiber connector, the optical fiber connector comprising:
    a fiber core;
    a connector body having a first end portion and a second end portion, wherein the first end portion connects and fixes the fiber core, the second end portion is depressed inwardly to define a coupling space, and the external optical fiber connector is detachably plugged into the coupling space and coupled with the fiber core;
    a coupling tube disposed in the connector body, wherein a portion of the coupling tube is located in the coupling space, and one end portion of the fiber core is permanently inserted and fixed in the coupling tube; and
    at least a coupling holder disposed in the coupling space, and corresponding to the coupling tube,
    wherein the other end portion of the fiber core is covered and fixed by, the connector body, the fiber core and the coupling tube are connected and disposed inside the connector body by coated injection, and the connector body the coupling holder, the coupling tube and the fiber core are directly integrated as one component during the manufacturing process.

2. The optical fiber connector according to claim 1, further comprising an optical fiber inserted into the first end portion of the connector body, wherein one end portion of the optical fiber is disposed in the fiber core, the optical fiber comprises at least a core portion and a covering portion encapsulating the core portion, and the covering portion is made of resin or rubber.

3. The optical fiber connector according to claim 2, further comprising an optical fiber fixing member, wherein one end of the optical fiber fixing member is connected to the first end portion of the connector body, and the optical fiber fixing member clips and fixes the optical fiber.

4. The optical fiber connector according to claim 3, wherein the optical fiber fixing member and the connector body are made of different materials and integrated as one component.

5. The optical fiber connector according to claim 1, wherein the connector body further comprises a limiting groove disposed on a surface of the second end portion of the connector body, and the limiting groove extends from an end surface of the second end portion toward the first end portion and communicates with the coupling space.

6. The optical fiber connector according to claim 1, wherein the end portion of the fiber core inserted in the coupling tube is a micro protruding ball end portion.

7. The optical fiber connector according to claim 6, wherein an end surface of the end portion of the fiber core is a planar surface or a slant surface.

8. The optical fiber connector according to claim 1, wherein the coupling tube is made of glass or ceramics.

9. The optical fiber connector according to claim 1, wherein the fiber core is made of glass or ceramics.

10. The optical fiber connector according to claim 1, wherein the coupling holders are located adjacent to an outer periphery of the coupling tube, the coupling holders are disposed corresponding to each other, and one end of each of the coupling holders is configured with a corresponding hook portion.

* * * * *